(12) United States Patent
Oouchi

(10) Patent No.: US 8,916,238 B2
(45) Date of Patent: *Dec. 23, 2014

(54) METHOD AND APPARATUS OF PRODUCING COMPOSITE FOR CARBON DIOXIDE SEPARATION

(71) Applicant: FUJIFILM Corporation, Minato-ku, Tokyo (JP)

(72) Inventor: Ryou Oouchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,855

(22) Filed: Jun. 25, 2013

(65) Prior Publication Data

US 2013/0287958 A1 Oct. 31, 2013

Related U.S. Application Data

(63) Continuation of application No. PCT/JP2011/079696, filed on Dec. 21, 2011.

(30) Foreign Application Priority Data

Jan. 12, 2011 (JP) .................. 2011-004276

(51) Int. Cl.
*B05D 3/02* (2006.01)
*B01D 53/00* (2006.01)
(Continued)

(52) U.S. Cl.
CPC *B01D 53/00* (2013.01); *B05D 1/30* (2013.01); *B05D 3/02* (2013.01); *B05D 7/24* (2013.01);
(Continued)

(58) Field of Classification Search
None
See application file for complete search history.

(56) References Cited

U.S. PATENT DOCUMENTS 5,409,525 A * 4/1995 Kazama et al. ................. 96/14
5,445,669 A * 8/1995 Nakabayashi et al. ............ 96/5
(Continued)

FOREIGN PATENT DOCUMENTS

CN 101925397 12/2010
JP 6-210145 A 8/1994
(Continued)

OTHER PUBLICATIONS

Okabe et al, Separation and Purification Technology, 57(2), pp. 242-249, 2007.*
(Continued)

*Primary Examiner* — Erma Cameron
(74) *Attorney, Agent, or Firm* — SOLARIS Intellectual Property Group, PLLC

(57) ABSTRACT

There is provided a method of producing a composite that separates carbon dioxide that has a carbon dioxide separating film on a support includes preparing, at greater than or equal to 50° C., a coating liquid for carbon dioxide separating film formation that contains a water absorbent polymer, a carbon dioxide carrier and a gelling agent, and that gels, after being left at 12° C. at a solution film thickness of less than or equal to 1 mm, within 120 seconds and liquid not dropping-off due to gravity; coating the coating liquid on a strip-shaped support; cooling, at less than or equal to 12° C., a coated film obtained by the coating, and obtaining a gel film; and drying the gel film at least by warm air, and obtaining a carbon dioxide separating film, wherein, from coating to drying are carried out continuously while conveying the support in a given direction.

9 Claims, 2 Drawing Sheets

(51) Int. Cl.
- B05D 1/30 (2006.01)
- B05D 7/24 (2006.01)
- B05C 5/00 (2006.01)
- B05D 7/26 (2006.01)
- B01D 67/00 (2006.01)
- B01D 69/14 (2006.01)
- B01D 53/22 (2006.01)
- B01D 71/08 (2006.01)

(52) U.S. Cl.
CPC ............... B05D 1/305 (2013.01); B05C 5/005 (2013.01); B05D 7/26 (2013.01); B01D 67/0011 (2013.01); B01D 69/142 (2013.01); *B01D 2323/42* (2013.01); B01D 53/228 (2013.01); B01D 71/08 (2013.01)
USPC .................. 427/374.1; 427/372.2; 427/374.2; 427/374.3; 427/385.5; 427/398.1

(56) References Cited

U.S. PATENT DOCUMENTS

| | | | |
|---|---|---|---|
| 2009/0110907 A1* | 4/2009 | Jiang et al. | 428/315.9 |
| 2010/0005959 A1* | 1/2010 | Littau et al. | 95/51 |
| 2011/0036237 A1 | 2/2011 | Okada et al. | |
| 2012/0219718 A1 | 8/2012 | Okada et al. | |
| 2013/0160650 A1 | 6/2013 | Okada et al. | |
| 2013/0284022 A1* | 10/2013 | Hiraki et al. | 96/4 |

FOREIGN PATENT DOCUMENTS

| | | |
|---|---|---|
| JP | 7-102310 B | 11/1995 |
| JP | 2009195900 A | 9/2009 |
| JP | 2010036123 A | 2/2012 |

OTHER PUBLICATIONS

Written Opinion of the ISA issued in International Application No. PCT/JP2011/079696 on Mar. 27, 2012.

International Search Report issued in International Application No. PCT/JP2011/079696 on Mar. 27, 2012.

Partial English language translation of the following: Office action dated Aug. 21, 2014 from the SIPO in a Chinese patent application corresponding to the instant patent application. This office action translation is submitted now in order to supplement the understanding of the cited references which are being disclosed in the instant Information Disclosure Statement.

* cited by examiner

METHOD AND APPARATUS OF PRODUCING COMPOSITE FOR CARBON DIOXIDE SEPARATION

CROSS-REFERENCE TO RELATED APPLICATIONS

This application is a continuation application of International Application No. PCT/JP/2011/079696, filed Dec. 21, 2011, the disclosure of which is incorporated herein by reference in its entirety. Further, this application claims priority from Japanese Patent Application No. 2011-004276, filed Jan. 12, 2011, the disclosure of which is incorporated herein by reference in its entirety.

BACKGROUND OF THE INVENTION

1. Technical Field

The present invention relates to a method of producing and an apparatus for producing a composite for separating carbon dioxide.

2. Related Art

The development of techniques for selectively separating carbon dioxide that is within a mixed gas has advanced in recent years. For example, as countermeasures to global warming, a technique has been developed of recovering and concentrating carbon dioxide within exhaust gas, and a technique has been developed that, by steam reforming, reforms hydrocarbon into hydrogen and carbon monoxide (CO), and further causes steam to react with the carbon monoxide so as to generate carbon dioxide and hydrogen, and, by eliminating the carbon dioxide by a film through which the carbon dioxide is selectively permeated, obtains a gas for fuel cells or the like whose main component is hydrogen.

For example, Japanese Patent Application Publication (JP-B) No. 7-102310 discloses a method of producing a carbon dioxide separating gel film by coating an uncrosslinked vinyl alcohol-acrylic acid salt copolymer aqueous solution in the form of a film on a carbon dioxide permeable support, and thereafter, carrying out heating and crosslinking and water insolubilization, and causing a carbon dioxide carrier aqueous solution to be absorbed by this water insoluble substance so as to form a gel.

Japanese Patent Application Laid-Open (JP-A) No. 6-210145 discloses a water-containing, gel-like gas separating film in which water or an aqueous solution of a substance having affinity with $CO_2$ is substantially uniformly made to be held within a supporting film that is formed of a macromolecule material, that is soluble in a solvent and has a bulky structural portion and a hydrophilic functional group within the repeating unit.

SUMMARY

In aforementioned JP-B No. 7-102310, the carbon dioxide separating gel film can be formed at a small area (e.g., an effective area of 9.62 cm$^2$), but it is difficult to stably form the carbon dioxide separating gel film at a substantially uniform film thickness on a carbon dioxide permeable support of a wide area. Further, in aforementioned JP-A No. 6-210145 as well, similarly, it is difficult to stably form a water-containing, gel-like gas separating film at a substantially uniform film thickness over a wide area.

Therefore, even if the inventions disclosed in aforementioned JP-B No. 7-102310 and JP-A No. 6-210145 are applied to a structure in which, for example, a strip-shaped support having a wide area is conveyed continuously and a carbon dioxide separating gel film or a water-containing, gel-like gas separating film is formed on the support, it is difficult to stably produce the carbon dioxide separating gel film or a water-containing, gel-like gas separating film at a substantially uniform film thickness.

The present invention was made in consideration of such matters, and provides a method of producing and an apparatus for producing a composite for separating carbon dioxide that, while conveying a strip-shaped support in a given direction, can stably produce a carbon dioxide separating film on the support with good mass-produceability.

A first aspect of the present invention provides a method of producing a composite that separates carbon dioxide that has a carbon dioxide separating film on a support, including: preparing, at greater than or equal to 50° C., a coating liquid for carbon dioxide separating film formation that contains a water absorbent polymer, a carbon dioxide carrier and a gelling agent, and that has the property of, after being left at 12° C. at a solution film thickness of less than or equal to 1 mm, gelling within 120 seconds and liquid not dropping-off due to gravity; coating the coating liquid on a strip-shaped support; cooling, at less than or equal to 12° C., a coated film obtained by the coating, and obtaining a gel film; and drying the gel film at least by warm air, and obtaining a carbon dioxide separating film, wherein, from the coating to the drying are carried out continuously while conveying the support in a given direction.

In accordance with the above-described aspect, a coating liquid for carbon dioxide separating film formation, that contains a water absorbent polymer, a carbon dioxide carrier and a gelling agent and that has the property of, after left at 12° C. at a solution film thickness of less than or equal to 1 mm, gelling within 120 seconds and liquid not dropping-off due to gravity, is prepared at greater than or equal to 50° C. Further, while the strip-shaped support is conveyed in a given direction, the prepared coating liquid is coated on the strip-shaped support, and the coated film obtained by coating is cooled at less than or equal to 12° C., and a gel film is obtained on the support. Namely, by gelling the coated film on the support before drying, the coated film is fixed on the support. Thereafter, the gel film on the support is dried at least by warm air, and a carbon dioxide separating film is obtained on the support. Due to a gel film being formed on the support, scattering of the gel film due to the warm air is prevented. Due thereto, while the strip-shaped support is conveyed in a given direction, the composite for separating carbon dioxide, that has a carbon dioxide separating film on a support, can be produced stably.

In the above-described first aspect, a conveying speed of the support from the coating to the drying may be greater than or equal to 20 m/min (m/minute).

In accordance with the above-described aspect, the conveying speed of the support from the coating to the drying is greater than or equal to 20 m/min, and the composite for separating carbon dioxide, that has a carbon dioxide separating film on a strip-shaped support, can be produced at a high mass produceability.

In the above-described first aspect, the coating liquid may be prepared at 60 to 85° C.

In the above-described first aspect, an air speed of the warm air at a time of drying may be 10 to 40 m/min.

In the above-described first aspect, a temperature of the warm air at a time of drying may be 40 to 60° C.

In the above-described first aspect, the gelling agent may be a polysaccharide.

In the above-described first aspect, the gelling agent may be an agar.

In the above-described first aspect, the carbon dioxide carrier may have an alkali metal carbonate.

In the above-described first aspect, the carbon dioxide carrier may be a compound containing cesium.

A second aspect of the present invention provides an apparatus that produces a composite that separates carbon dioxide that has a carbon dioxide separating film on a support, the apparatus including: a conveying unit that supports a strip-shaped support by plural rollers, and conveys the support in a given direction; a coating device that coats, on the support that is conveyed by the conveying unit, a coating liquid for carbon dioxide separating film formation that contains a water absorbent polymer, a carbon dioxide carrier and a gelling agent, and that is prepared at greater than or equal to 50° C.; a cooling device that is provided further toward a downstream side, in a conveying direction of the support, than the coating device, and that cools, at less than or equal to 12° C., a coated film that was coated on the support by the coating device, and obtains a gel film; and a drying device that is provided further toward a downstream side, in the conveying direction of the support, than the cooling device, and that dries the gel film, that was formed on the support, at least by warm air, and obtains a carbon dioxide separating film.

In accordance with the above-described aspect, in a state in which the strip-shaped support is supported by the plural rollers, the support is conveyed in a given direction by the conveying unit. The coating liquid for carbon dioxide separating film formation, that includes a water absorbent polymer, a carbon dioxide carrier and a gelling agent and that has been prepared at 50° C. or higher, is coated by the coating device to a substantially uniform film thickness on the support that is conveyed by the conveying unit. Further, the coated film, that has been coated on the support, is cooled at less than or equal to 12° C. by the cooling device, and a gel film is obtained on the support. Namely, by gelling the coated film on the support before drying, the coated film is fixed on the support. Then, the gel film that is formed on the support is dried by warm air of the drying device, and a carbon dioxide separating film is obtained on the support. At this time, due to the gel film being formed on the support, scattering of the gel film due to the warm air is prevented. Due thereto, while the strip-shaped support is conveyed in a given direction, the composite for separating carbon dioxide, that has a carbon dioxide separating film on a support, can be produced stably.

In the above-described second aspect, a conveying speed of the support by the conveying unit may be greater than or equal to 20 m/min.

In accordance with the above-described aspect, the conveying speed of the support by the conveying unit is greater than or equal to 20 m/min, and the composite for separating carbon dioxide, that has a carbon dioxide separating film on a strip-shaped support, can be produced at a high mass produceability.

In the above-described second aspect, the coating liquid may be prepared at 60 to 85° C.

In the above-described second aspect, an air speed of the warm air of the drying device may be 10 to 40 m/min.

In the above-described second aspect, a temperature of the warm air of the drying device may be 40 to 60° C.

In accordance with the aspects of the present invention, while a strip-shaped support is conveyed in a given direction, a carbon dioxide separating film can be produced on the support stably and with high mass produceability.

DETAILED DESCRIPTION

An apparatus for producing and a method of producing a composite for separating carbon dioxide, that are exemplary embodiments of the present invention, are described hereinafter with reference to FIGS. 1 and 2.

In order to produce a carbon dioxide separating film with high efficiency (at a high speed and a low cost), the present inventors thought of applying a Roll-to-Roll (hereinafter abbreviated as "R to R" upon occasion) method that uses a strip-shaped support (substrate film). When utilizing a water-based coating in R to R, in order to suppress portions of the coated film being sent flying when air for drying hits in case of the drying step and dispersion in the film thickness, the coated film needs to be set (fixed) before drying. Thus, the present inventors discovered a producing apparatus and producing method in which a coating film is coated on a strip-shaped support while the support is conveyed in a given direction, and the coated film on the support can set immediately, and, even if air for drying hits the coated film, the film before curing is not sent flying, and a carbon dioxide separating film having excellent uniformity of film thickness and an excellent gas separating characteristic can be obtained.

(Overall Structure of Producing Apparatus)

Figure 1:
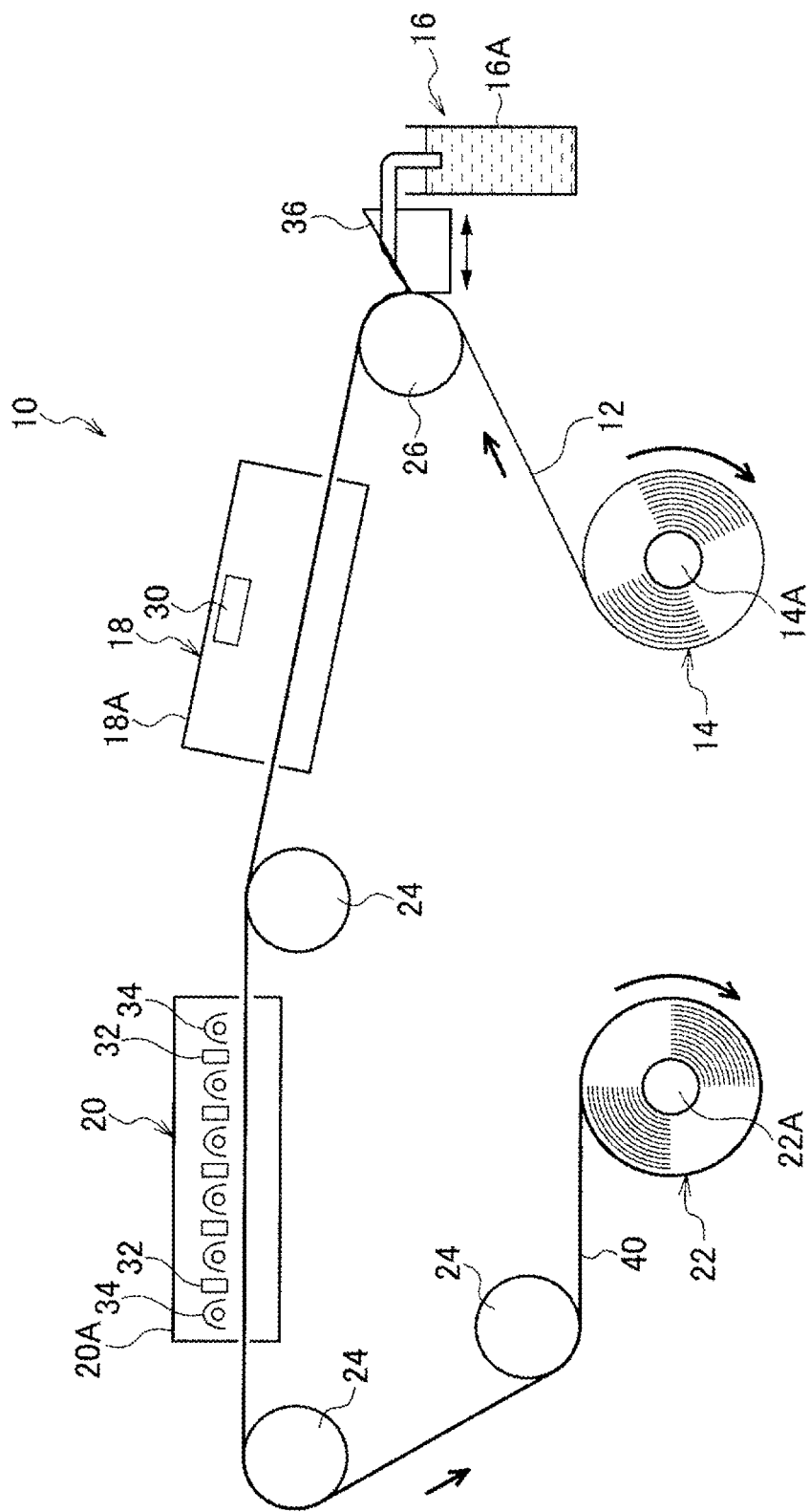
FIG. 1 is a structural drawing showing an apparatus for producing a composite for separating carbon dioxide relating to an exemplary embodiment.
Figure 2:
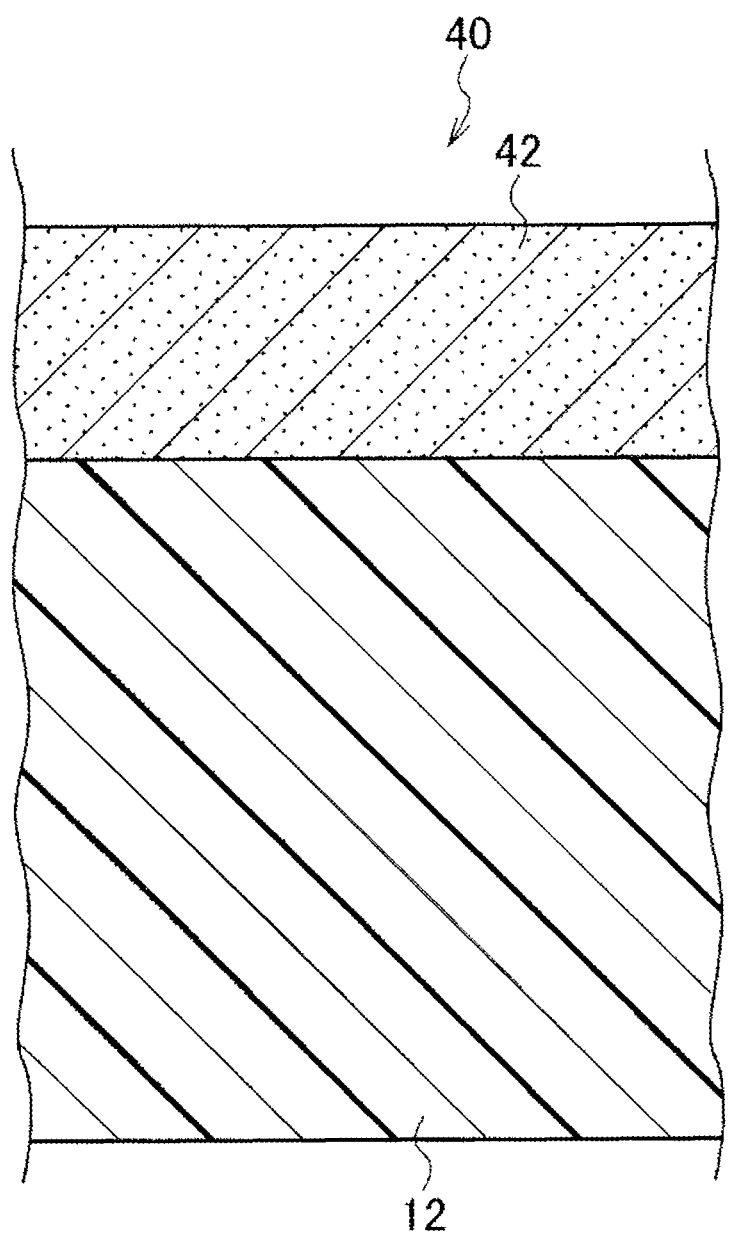
FIG. 2 is an enlarged sectional view showing a composite for separating carbon dioxide.

The overall structure of an apparatus for producing a composite for separating carbon dioxide is shown in FIG. 1. As shown in this drawing, a producing apparatus 10 of a composite for separating carbon dioxide has a feed-out roller 14 that serves as an example of a conveying unit that feeds-out a strip-shaped support 12 in a given direction, and plural reverse surface supporting rollers (rollers) 24, 26 that support the support 12. A shaft portion 14A on which the support 12 is wound is provided at the feed-out roller 14, and the support 12 is fed-out due to the shaft portion 14A rotating in the direction of the arrow. Further, the support 12 is conveyed in a given direction in a state in which the reverse surface side of the support 12 is trained along the reverse surface supporting rollers 24.

Further, the producing apparatus 10 of a composite for separating carbon dioxide has, in order from the upstream side toward the downstream side along the conveying direction of the support 12 that is fed-out from the feed-out roller 14, a coating device 16 that coats a coating liquid for carbon dioxide separating film formation that is described later onto the obverse surface of the support 12, a cooling unit 18 that serves as an example of a cooling device that, in a non-contacting state, cools the coating liquid for carbon dioxide separating film formation, that has been coated on the support 12, so as to obtain a gel film, and a drying unit 20 that serves as an example of a drying device that, in a non-contacting state, dries the gel film on the support 12 and obtains a carbon dioxide separating film.

Moreover, at the downstream side, in the conveying direction of the support 12, of the drying unit 20, the producing apparatus 10 of a composite for separating carbon dioxide has a take-up roller 22 that serves as an example of a conveying unit that takes up a composite 40 for separating carbon dioxide (see FIG. 2) at which a carbon dioxide separating film 42 is formed on the support 12. A shaft portion 22A that takes-up the composite 40 for separating carbon dioxide is provided at the take-up roller 22. Due to the shaft portion 22A being rotated in the direction of the arrow by an unillustrated motor, the support 12 is conveyed in a given direction (the direction of the arrow) at a predetermined speed.

(Support)

The support 12 supports the carbon dioxide separating film 42, and is carbon dioxide permeable. The support 12 is not particularly limited provided that it is a body on which the carbon dioxide separating film 42 (see FIG. 2) can be formed by coating the coating liquid for carbon dioxide separating film formation (a water-based composition) relating to the present invention, and further, that can support this film. Examples of materials of the support are paper, resin (polyester, polyolefin, and the like), non-woven fabric, ceramic, metal, glass, and the like. Because mass production is carried out by R to R, an elongated, strip-shaped paper or non-woven cloth, resin film is preferably used for the support 12. However, in a case in which a support that has poor gas permeability such as a PET film is used, the carbon dioxide separating film that is formed needs to be peeled-off from the support, and therefore, paper and non-woven fabrics are particularly preferable.

If the support 12 is too thick, the gas permeability deteriorates, and if the support 12 is too thin, there are difficulties with regard to strength. From the standpoints of strength, gas permeability, conveyability and the like, the thickness of the support 12 is preferably 30 to 1000 µm, and 75 to 500 µm is more preferable.

The size (area) of the support 12 is not limited, but, the larger the support 12, the easier it is for the film thickness of the coated film to vary, and the easier it is for holes that are not gas-selective, such as pin holes or the like, to form. However, in the present invention, it is possible to form a good gel film and effectively prevent dispersion in the film thickness and the generation of holes. Further, from the standpoint of mass produceability, it is preferable that the area of the support 12 be greater than or equal to 30 $cm^2$.

The conveying speed of the support 12 depends as well on type of the support 12 and the viscosity of the coating liquid (the water based composition) and the like. However, if the conveying speed of the support is too high, there is the concern that the uniformity of the film thickness of the coated film in the coating step will deteriorate. If the conveying speed is too slow, in addition to the mass produceability deteriorating, there is also the concern that the viscosity of the coating liquid (the water based composition) will rise before the cooling step and the uniformity of the coated film will deteriorate. It suffices to determine the conveying speed of the support 12 in consideration of the aforementioned points as well and in accordance with the type of the support 12 and the viscosity of the coating liquid (the water based composition) and the like, but greater than or equal to 20 m/min is preferable, and 30 to 200 m/min is preferable.

(Coating Liquid for Carbon Dioxide Separating Film Formation)

The coating liquid (water based composition) for carbon dioxide separating film formation, that is coated on the obverse surface of the support 12 by the coating device 16, is structured by appropriate amounts of at least a water absorbent polymer and a carbon dioxide carrier, and in addition, a specific gelling agent that provides a good setting ability, respectively being added to water. The coating liquid for carbon dioxide separating film formation of exemplary embodiments of the present invention has the property that, after left at 12° C. at a solution film thickness of less than or equal to 1 mm, gelling occurs within 120 seconds and the liquid does not drop off due to gravity. The coating liquid for carbon dioxide separating film formation is prepared at greater than or equal to 50° C. as is described later.

(Water Absorbent Polymer)

The water absorbent polymer that is contained in the coating liquid (water based composition) of exemplary embodiments of the present invention functions as a binder, and, in case of being used as a carbon dioxide separating film, holds moisture and causes the function of separating carbon dioxide by the carbon dioxide carrier to be exhibited. The water absorbent polymer can be dissolved in water so as to form a coating liquid, and, from the standpoint of the carbon dioxide separating film having a good water absorbing ability (moisture retaining ability), is preferably a polymer that has a good water absorbing ability, and preferably has a water absorbing ability that is greater than or equal to 10 times.

From the standpoints of the water absorbing ability, film forming ability, strength and the like, for example, a polyvinyl alcohol-polyacrylic acid (PVA-PAA) copolymer, polyvinyl alcohol, polyacrylic acid, polyacrylic acid salt, polyvinylbutyral, poly-N-vinylpyrrolidone, poly-N-vinylacetoamide, and polyacrylamide are suitable as the water absorbent polymer that is contained in the coating liquid (water based composition) of exemplary embodiments of the present invention, and PVA-PAA copolymers are particularly preferable. PVA-PAA copolymers have a good water absorbing ability, and in addition, the strength of a hydrogel is good even at times of high water absorption. The content rate of the polyacrylic acid salt in the PVA-PAA copolymer is, for example, 5 to 95 mol %, and preferably 30 to 70 mol %. In addition to alkali metal salts such as sodium salts and potassium salts and the like, ammonium salts and organic ammonium salts and the like are examples of the polyacrylic acid salt. For example, Sumica Gel L-5H (produced by Sumitomo Chemical Co., Ltd.) is an example of a commercially available PVA-PAA copolymer.

Although the content rate of the water absorbent polymer in the coating liquid (the water based composition) depends also on the type thereof, 1 to 30 wt % is preferable and 2 to 15 wt % is more preferable from the standpoints of forming a film as a binder and the carbon dioxide separating film being able to sufficiently retain moisture.

(Carbon Dioxide Carrier)

It suffices for the carbon dioxide carrier that is contained in the coating liquid (the water based composition) of exemplary embodiments of the present invention to have affinity with carbon dioxide and to exhibit water solubility, and known carbon dioxide carriers can be used. The carbon dioxide carrier in this case is a substance that has affinity with carbon dioxide, and various types of water-soluble inorganic and organic substances that exhibit basicity are used. For example, alkali metal carbonates, alkali metal bicarbonates, and alkali metal hydroxides are examples.

Examples of alkali metal carbonates are, for example, lithium carbonate, sodium carbonate, potassium carbonate, rubidium carbonate, and cesium carbonate.

Examples of alkali metal bicarbonates are, for example, lithium hydrogencarbonate, sodium hydrogencarbonate, potassium hydrogencarbonate, rubidium hydrogencarbonate, and cesium hydrogencarbonate.

Examples of alkali metal hydroxides are, for example, cesium hydroxide, rubidium hydroxide, and the like.

Among these, alkali metal carbonates are preferable, and compounds that contain cesium or rubidium are preferable.

Further, two or more types of carbon dioxide carriers may be used by being mixed together.

Although the content rate of the carbon dioxide carrier within the coating liquid (water based composition) depends as well on the type thereof, the content rate is preferably 0.5 to 30 wt %, and is more preferably 3 to 20 wt %, and is particularly preferably 5 to 15 wt %, in order to prevent salting-out before coating and to reliably exhibit the carbon dioxide separating function.

(Gelling Agent)

As the gelling agent that is contained in the coating liquid (water based composition) of exemplary embodiments of the present invention, there can be used a gelling agent that can form a gel film (set film) having good uniformity of film thickness, by coating a coating liquid, in which the gelling agent is added to an aqueous solution containing a water absorbent polymer and a carbon dioxide carrier, on a support so as to form a coated film, and cooling the coated film.

Concretely, it is preferable to include a gelling agent having the property that, after a coating liquid (water based composition) that contains a water absorbent polymer, a carbon dioxide carrier, a gelling agent and water, is prepared at 50° C. or higher and is left at 12° C. at a solution film thickness of 1 mm or less, the coating liquid gels within 120 seconds and liquid does not drop-off due to gravity. If the coating liquid is gelled in a time longer than 120 seconds, it is difficult to more reliably fix the coating liquid as a gel film on the support 12 while passing through the cooling unit 18.

As such a gelling agent, from the standpoints of film forming ability, ease of acquisition, cost, film strength and the like, polysaccharides are preferable, and thickened polysaccharides are more preferable, and agars are particularly preferable. As such polysaccharides, from the standpoints of film forming ability, ease of acquisition, cost, film strength and the like, agars are preferable, and Ina Kanten UP-37, UM-11S, SY-8, ZY-4, ZY-6 (all produced by Ina Kanten Company), and Agarose H, Agarose S (both produced by Nippon Gene Co., Ltd.), and the like are examples of commercially available products.

The content of the polysaccharide within the coating liquid (water based composition) depends on the type thereof as well, but if the content of the polysaccharide is too great, the coating liquid may become highly viscous in a short time and become difficult to apply. Further, from the standpoint of suppressing a deterioration in the uniformity of the film thickness, less than or equal to 10 wt % is preferable, and 0.1 wt % to 8 wt % is more preferable, and further, 0.3 wt % to 5 wt % is most preferable.

(Other Components)

The coating liquid (water based composition) of the present invention can include components (additives) other than a water absorbent polymer, a carbon dioxide carrier and polysaccharides, within ranges of not adversely affecting the film forming ability (the coatability and setting ability) and the gas separating characteristic.

Examples include crosslinking agent, surfactants, catalysts, auxiliary solvents, film strength adjusting agents, and defect detecting agents.

The crosslinking of the water absorbent polymer can be carried out by a conventionally known method such as thermal crosslinking, ultraviolet crosslinking, electron beam crosslinking, radiation crosslinking, and the like. In particular, polyvalent glycidyl ethers, polyvalent alcohols, polyvalent isocyanates, polyvalent aziridines, haloepoxy compounds, polyvalent aldehydes, polyvalent amines, and the like are examples of crosslinking agents having two or more functional groups that can react with and thermally crosslink polyvinylalcohol-polyacrylic acid salt copolymers.

In preparing the coating liquid (water based composition), the above-described water absorbent polymer, carbon dioxide carrier and gelling agent, and other additives as needed, are respectively added in appropriate amounts to water (room temperature water or heated water) and sufficient mixing is carried out, and, as needed, dissolving is promoted by heating while stirring. Note that the water absorbent polymer, the carbon dioxide carrier and the gelling agent may be added separately to the water, or a mixture in which these have been mixed together in advance may be added to the water. For example, after the gelling agent is added to water and dissolved, by gradually adding the water absorbent polymer and carbon dioxide carrier thereto and stirring, precipitation (salting-out) of the water absorbent polymer and the polysaccharide can be effectively prevented.

(Coating Device)

The coating device 16 is a device that coats the coating liquid (water based composition) for carbon dioxide separating film formation that has been prepared at 50° C. or higher, onto the obverse surface of the support 12 that is conveyed in a given direction.

If the temperature of the coating liquid in the coating step by the coating device 16 falls, the viscosity may increase due to the coagulating action of the gelling agent, or the water absorbent polymer may precipitate (salt-out) and coating onto the support may become difficult, and the dispersion in film thickness may become large. Therefore, after the coating liquid (water based composition) of the present invention is prepared, it is preferable to, until coating, maintain the temperature thereof such that gelling and salting-out do not occur. It suffices to determine the temperature of the coating liquid (water based composition) in the coating step in accordance with the composition and concentration such that gelling and salting-out do not arise. However, if the temperature is too high, a large amount of water may evaporate from the water based composition and the composition concentration may change, and gelling may advance locally. Therefore, the temperature is usually 50° C. or higher, and around 60 to 85° C. is preferable.

The coating device 16 of the present exemplary embodiment has a storage portion 16A that stores the coating liquid for carbon dioxide separating film formation that was prepared at 50° C. or higher, and a coating die 36 that the coating liquid stored in the storage portion 16A flows-out to and that is adjacent to the reverse surface supporting roller 26 in case of coating. The coating die 36 can freely adjust the flow rate of the coating liquid and the width of the gap between the coating die 36 and the support, and can apply the coating liquid with various thicknesses on supports of various thicknesses. Although not illustrated, a heater that maintains the coating liquid at 50° C. or higher, and a stirring device that stirs the coating liquid, are provided at the storage portion 16A.

The coating device 16 is not limited to the above-described structure, and, for example, a curtain flow coater, an extrusion die coater, an air doctor coater, a blade coater, a rod coater, a knife coater, a squeeze coater, a reverse roll coater, a bar coater, or the like is selected appropriately. In particular, an extrusion die coater is preferable from the standpoints of uniformity of film thickness, the coated amount, and the like.

The coated amount depends also on the composition, the concentration and the like of the water based composition. However, if the coated amount per unit area is too small, holes may form in the film in the cooling step or the heating step, and the strength as a carbon dioxide separating film may be insufficient. On the other hand, if the coated amount is too large, the dispersion in film thickness may become greater, and the film thickness of the obtained carbon dioxide separating film may be too large and the permeability of carbon dioxide may deteriorate.

From these standpoints, it is preferable that the coated amount be adjusted such that the thickness of the gel film that is obtained in the cooling step is greater than or equal to 30 µm, and more preferably greater than or equal to 50 µm and particularly preferably greater than or equal to 100 µm, and the thickness of the carbon dioxide separating film that is obtained in the heating step is 5 to 50 µm, and more preferably 10 to 40 µm and particularly preferably 15 to 30 µm.

(Cooling Unit)

At the cooling unit 18, the coated film that is coated on the support 12 is cooled and a gel film is obtained. Due to the support 12, on which the coated film has been formed, being conveyed to the cooling unit 18 and being cooled immediately, the coated film gels (is fixed) by the coagulating action of the gelling agent, and a stable gel film (set film) is obtained.

If the cooling temperature in the cooling step is too high, it may take time to fix the coated film and the uniformity of the film thickness will deteriorate. If the cooling temperature in the cooling step is too low, the gel film may freeze and the film quality may change. In order to obtain a gel film at which the thickness of the coated film is maintained substantially uniformly, it suffices to determine the cooling temperature in the cooling step in accordance with the components and concentration of the coated film (the type and concentration of the polysaccharide in particular). However, from the standpoint of rapidly gelling the coated film on the support 12 and forming a gel film, the cooling temperature in the cooling step is preferably less than or equal to 12° C., and 5 to 10° C. is more preferable.

Further, from the standpoint of improving the mass produceability and the like, the passage time in the cooling step is preferably 1 to 200 seconds, and 30 to 150 seconds is more preferable. In the present exemplary embodiment, the passage time in the cooling step is made to be around 110 seconds.

The cooling unit 18 of the present exemplary embodiment has a housing 18A into and from which the support 12 is conveyed in and out, and a heat exchanger 30 that cools gas that is introduced in from the exterior. The interior of the housing 18A is maintained at 12° C. or less.

The heat exchanger 30 cools gas by circulating a coolant and by condensation/evaporation. However, the heat exchanger is not limited to this, and various structures can be used, such as a device that feeds cool air at a heat exchanger that is cooled by water flow, or a structure that uses a Peltier element, or the like.

At the cooling unit 18, the coated film that has been coated on the support 12 by the coating device 16 can be rapidly gelled and made into a gel film, and therefore, the film thickness can be controlled accurately.

(Drying Unit)

At the drying unit 20, the gel film on the support 12, that has been gelled by the cooling unit 18, is dried and thermally crosslinked, and a carbon dioxide separating film is obtained. For example, the gel film is dried and crosslinked by warm air being made to hit the gel film on the support 12 that is conveyed by the drying unit 20. Because the film after the cooling step is fixed in a gel form, even if air for drying directly hits the gel film, the gel film dries without collapsing.

The air speed is preferably set to be a speed that can rapidly dry the gel film but such that the gel film does not collapse, e.g., 1 to 80 m/min, and 6 to 70 m/min is more preferable, and 10 to 40 m/min is particularly preferable. In the present exemplary embodiment, the air speed is made to be 30 m/min.

So that deformation and the like of the support does not arise and the gel film can be dried rapidly, the temperature of the air is preferably set to 20 to 80° C. and 30 to 70° is more preferable, and 40 to 60° is particularly preferable. In the present embodiment, the temperature of the air is made to be around 50° C.

The drying and crosslinking in the heating step may be carried out simultaneously, or may be carried out separately. For example, after warm air hits and dries the gel film, the gel film may be crosslinked by a heating unit such as an infrared heater or the like, or the gel film may be crosslinked together with being dried by warm air. Thermal crosslinking can be carried out by heating to around 100 to 150° C. for example.

The drying unit 20 of the present exemplary embodiment has a housing 20A into and from which the support 12 is transported in and out, and plural air heaters 32 and plural halogen heaters 34 that are disposed within this housing 20A and that dry the gel film on the obverse surface of the support 12. The air heaters 32 are disposed at a predetermined interval with respect to the obverse surface of the support 12, and dry the gel film on the support 12 by blowing-out warm air onto the obverse surface of the support 12.

The halogen heaters 34 are disposed at a predetermined interval with respect to the obverse surface of the support 12, and dry the gel film on the support 12 by heat. In the present embodiment, the plural air heaters 32 and halogen heaters 34 are disposed alternately, and the gel film on the obverse surface of the support 12 is dried and thermally crosslinked by these air heaters 32 and halogen heaters 34, and the carbon dioxide separating film 42 (see FIG. 2) is obtained. In the present embodiment, the plural air heaters 32 and halogen heaters 34 are disposed alternately, but the present invention is not limited to this structure, and, for example, may be a structure provided with only the plural air heaters 32.

Further, at the producing apparatus 10 of a composite for separating carbon dioxide, as needed, a coating device (not shown in the figures) and a drying device (not shown in the figures) and the like for forming a carrier elution preventing layer on the carbon dioxide separating film 42 formed on the obverse surface of the support 12, may be provided at the downstream side, in the conveying direction of the support 12, of the drying unit 20.

A method of producing a composite for separating carbon dioxide by the producing apparatus 10, that is the operation of the producing apparatus 10 of a composite for separating carbon dioxide, is described next.

As shown in FIG. 1, at the producing apparatus 10 of a composite for separating carbon dioxide, the strip-shaped support 12 is fed-out by the feed-out roller 14, and the support 12 is conveyed in a given direction in a state of being supported by the plural reverse surface supporting rollers 24. The support 12, that has been fed-out from the fed-out roller 14, is conveyed to a position facing the coating device 16, and the coating liquid for carbon dioxide separating film formation, that has been prepared at 50° C. or higher, is coated on the obverse surface of the support 12 by the coating device 16. Due thereto, a coated film of a substantially uniform film thickness is formed on the support 12.

Thereafter, the support 12 is conveyed to the cooling unit 18. Due to the support 12 passing through the interior of the housing 18A of the cooling unit 18, the coated film on the support 12 is cooled at 12° C. or lower, and a gel film is obtained. Namely, due to the coated film, that is coated on the support 12, being gelled before drying, the coated film is fixed on the support 12.

Moreover, the support 12 is conveyed to the drying unit 20, and, due to warm air being blown-out from the plural air heaters 32 and due to the heat of the halogen heaters 34, the gel film formed on the obverse surface of the support 12 is dried and is thermally crosslinked. Due to the gel film being formed on the support 12, scattering of the gel film due to the warm air from the air heaters 32 is prevented at the drying unit 20. Due thereto, as shown in FIG. 2, the composite 40 for separating carbon dioxide, at which the carbon dioxide separating film 42 is formed on the obverse surface of the support 12, is obtained. The composite 40 for separating carbon dioxide that is formed in this way is taken-up onto the take-up roller 22.

In the producing apparatus 10 of the composite 40 for separating carbon dioxide and in the method of producing the composite 40 for separating carbon dioxide, the carbon dioxide separating film 42, that has a substantially uniform film thickness on the support 12, can be produced stably and with good mass-produceability, while the support 12 that is strip-shaped is conveyed in a given direction. Namely, by immediately cooling the coated film, that has been coated on the support 12, and obtaining a gel film, the gel film becomes a substantially uniform film thickness, and, even though the gel film on the support 12 is dried by warm air from the air heaters 32 and the like, scattering of the gel film is prevented. Therefore, the carbon dioxide separating film 42, that has a film thickness that is thick to a certain extent, can be formed on the support 12 over a large area by a simple method and in a short time.

EXAMPLES

The present invention is described more concretely hereinafter by giving examples. Note that the materials, usage amounts, proportions, contents of processings, order of processings, and the like that are shown in the following examples can be changed appropriately in so far as such changes do not deviate from the gist of the present invention. Accordingly, the scope of the present invention is not to be interpreted in a manner limited by the concrete examples that are shown hereinafter.

First Example (Preparation of Coating Liquid)

A predetermined amount (refer to Table 1) of a gelling agent was added to 600 g of water while stirring at room temperature, and the mixture was heated to 80° C. so as to dissolve the gelling agent. After the gelling agent was completely dissolved, 230 g of an aqueous solution of 10 wt % of a polyvinyl alcohol-polyacrylic acid copolymer serving as example of the water absorbent polymer was added. Thereafter, 150 g of an aqueous solution of 40 wt % of cesium carbonate serving as an example of the carbon dioxide carrier, and 2 g of glutalaldehyde, were added, and a coating liquid for carbon dioxide separating film formation was prepared.

As shown in Table 1, testing was carried out by using two types of agar (Ina Kanten UM-11S, UP37 (produced by Ina Kanten Company)), whose added amounts were varied, as the gelling agents in Examples 1 through 3. Further, testing was carried out for a case in which the concentration of agar that served as the gelling agent was low in Comparative Example 1, a case in which k-carrageenan (produced by Marine Science Co., Ltd.: a substance that is not agar) was used as the gelling agent in Comparative Example 2, and a case in which a gelling agent was not added in Comparative Example 1.

(Gelling Test)

The coating liquid for carbon dioxide separating film formation of 80° C. was coated on a PET film serving as an example of a support, by using a baker applicator and at a clearance of 1 mm. Thereafter, the coated support was left at rest for a given time in a cooling box (cooling device) of 12° C. After being left at rest, the coated support was removed from the cooling box, and the top and bottom thereof were inverted, and the state of the gelling after being left at rest for 60 seconds was evaluated by eye observation. The shortest amount of time in which the coated support was left at rest at a low temperature in the cooling box and became unable to move at all is the gelling time. Cases in which the gel film moved even after being left at rest for 600 seconds or more were given the evaluation of "C".

(Coating Test)

Coating of the coating liquid for carbon dioxide separating film formation was carried out by the producing apparatus 10 that has the coating device 16, the cooling unit 18, the drying unit 20 such as shown in FIG. 1 and that continuously conveys the support 12.

As the conditions, the conveying speed of the support 12 was made to be 20 m/min, and the wet film thickness was adjusted to 500 μm by varying the coated amount of the coating liquid. The cooling unit 18 was set to 9° C. and such that 110 seconds was required until the support 12 passed therethrough. The drying unit 20 carried out drying by causing warm air of 50° C. and an air speed of 30 m/min to hit the film surface of the support 12 directly for 400 seconds.

The above-described coating test was carried out, and the state of the surface state of the carbon dioxide separating film of the support 12 at the time of taking-up was evaluated. The state of the surface state of the carbon dioxide separating film was evaluated as "A" if there being no problems in the surface state, "B" if portions where the film had disappeared existed and a continuous film was not obtained, and "C" if the film had disappeared completely.

The results of the gelling test and the coating test are shown in Table 1.

TABLE 1

| No. | gelling agent | added amount (g) | gelling time | coating test |
|---|---|---|---|---|
| Example 1 | UP-37 | 10 | 60 | A |
| Example 2 | UP-37 | 5 | 80 | A |
| Example 3 | UM-11S | 10 | 100 | A |
| Comparative Example 1 | UM-11S | 5 | 160 | B |
| Comparative Example 2 | k-carrageenan | 10 | 300 | C |
| Comparative Example 3 | not added | 0 | C | C |

As shown in Table 1, in a case in which the coating liquids were prepared to predetermined concentrations by using agars as the gelling agents of Examples 1 through 3, in all cases, the film gelled within 120 seconds, and it was confirmed that the state was good. Further, as shown in Table 1, it was confirmed in the coating test that there were no problems with the surface states of the carbon dioxide separating films.

In contrast, in the case of Comparative Example 1 in which the concentration of the gelling agent was low, and in the case of Comparative Example 2 in which k-carrageenan was used as the gelling agent, and in the case of Comparative Example 3 in which a gelling agent was not added, it was confirmed that the state of the gelling after having been left at rest in a cooling box (cooling device) of 12° C., and the surface state of the carbon dioxide separating film, were both not good.

Further, in Comparative Example 3, it was confirmed that the film did not gel in 600 seconds in case of being left at 12° C. under the above-described conditions. Namely, in cases in which the gelling is slow or does not occur, it suggests that a good carbon dioxide separating film cannot be obtained efficiently by a roll-to-roll form.

Second Example

For the samples of "A" in the above-described coating test, the carbon dioxide separating film was peeled-off from the PET film, and a mixed gas that was mixed in a ratio of $CO_2/H_2=10/90$ was used as a test gas, and after this mixed gas was supplied to the film in saturated steam and at a pressure of 1 atm and a temperature of 100° C., the gas that permeated through was analyzed by gas chromatography. As a result, the ratio of the permeabilities of $CO_2$ and $H_2$ was greater than or equal to 100:1, and the good effect was obtained that the $CO_2$ separation selectivity of the carbon dioxide separating film was excellent.

Note that the producing apparatus and producing method of a composite for separating carbon dioxide relating to the present invention are not limited to the above-described embodiments, and can, of course, employ various structures without deviating from the gist of the present invention.

The disclosure of Japanese Patent Application No. 2011-004276 is, in its entirety, incorporated by reference in the present Description.

All of the documents, patent applications and technical standards mentioned in the present description are incorporated by reference into the present description to the same extent as if such individual document, patent application or technical standard was specifically and individually indicated to be incorporated by reference.

What is claimed is:

1. A method of producing a composite that separates carbon dioxide that has a carbon dioxide separating film on a support, comprising in the following order:

preparing, at greater than or equal to 50° C., a coating liquid for carbon dioxide separating film formation that contains a water absorbent polymer, a carbon dioxide carrier and a gelling agent, and that has the property of, after being left at 12° C. at a solution film thickness of less than or equal to 1 mm but greater than 0 mm, gelling within 120 seconds and liquid not dropping-off due to gravity;

coating the coating liquid on a strip-shaped support;

cooling, at less than or equal to 12° C., a coated film obtained by the coating, and obtaining a gel film; and drying the gel film at least by warm air, and obtaining a carbon dioxide separating film, wherein, from the coating to the drying are carried out continuously while conveying the support in a given direction.

2. The method of producing a composite that separates carbon dioxide of claim 1, wherein a conveying speed of the support from the coating to the drying is greater than or equal to 20 m/min.

3. The method of producing a composite that separates carbon dioxide of claim 1, wherein, in the preparing of the coating liquid, the coating liquid is prepared at 60 to 85° C.

4. The method of producing a composite that separates carbon dioxide of claim 1, wherein, in the drying, an air speed of the warm air is 10 to 40 m/min.

5. The method of producing a composite that separates carbon dioxide of claim 1, wherein, in the drying, a temperature of the warm air is 40 to 60° C.

6. The method of producing a composite that separates carbon dioxide of claim 1, wherein the gelling agent is a polysaccharide.

7. The method of producing a composite that separates carbon dioxide of claim 1, wherein the gelling agent is an agar.

8. The method of producing a composite that separates carbon dioxide of claim 1, wherein the carbon dioxide carrier has an alkali metal carbonate.

9. The method of producing a composite that separates carbon dioxide of claim 1, wherein the carbon dioxide carrier is a compound containing cesium.

* * * * *